(12) United States Patent
Lundin

(10) Patent No.: US 7,474,645 B2
(45) Date of Patent: Jan. 6, 2009

(54) CHARGING METHOD

(75) Inventor: Terje Lundin, Tampere (FI)

(73) Assignee: Nokia Siemens Networks Oy, Espoo (FI)

( * ) Notice: Subject to any disclaimer, the term of this patent is extended or adjusted under 35 U.S.C. 154(b) by 813 days.

(21) Appl. No.: 10/457,842

(22) Filed: Jun. 10, 2003

(65) Prior Publication Data

US 2004/0202145 A1 Oct. 14, 2004

Related U.S. Application Data

(60) Provisional application No. 60/461,815, filed on Apr. 11, 2003.

(51) Int. Cl.
*H04Q 7/24* (2006.01)
*H04B 7/00* (2006.01)

(52) U.S. Cl. ..................... 370/338; 455/406

(58) Field of Classification Search ............ 370/338; 455/405–406, 410–411, 432.1–432.3
See application file for complete search history.

(56) References Cited

U.S. PATENT DOCUMENTS

2004/0037255 A1* 2/2004 Joong et al. ............ 370/338
2006/0229071 A1* 10/2006 Haverinen et al. ....... 455/432.1

* cited by examiner

*Primary Examiner*—Lee Nguyen
(74) *Attorney, Agent, or Firm*—Squire, Sanders & Dempsey L.L.P.

(57) ABSTRACT

A method of charging a subscriber of a communications network where a network element pretends to be a user's terminal equipment and sends a messaging message on the user's behalf to a predetermined destination address from a system element in order to bill the customer for use of a chargeable service, when the system element knows the user's telephone number or other user identification. A message center in the communications system is configured to charge the user according to the fee associated with the destination number. For example, the messaging message may be a short message sent to a predetermined number, which causes a short message center to bill the user accordingly.

23 Claims, 2 Drawing Sheets

CHARGING METHOD

CROSS REFERENCE TO RELATED APPLICATIONS

This application claims priority of U.S. Provisional Patent Application Ser. No. 60/461,815, entitled "A Charging Method," filed on Apr. 11, 2003, the contents of which are hereby incorporated by reference.

BACKGROUND OF THE INVENTION

1. Field of the Invention

The invention relates to a method of charging a subscriber of a communications network.

2. Description of the Related Art

Normally, when a subscriber uses a communications network like a GSM (Global System for Mobile Communications) network, this use is not free. The network operator collects data about the calls made, and based on this collected data the subscriber is billed. Every call or other transaction generates typically several charging records, also called toll tickets, in the network subsystem of the GSM network. The MSC (Mobile Services Switching Center) and the HLR (Home Location Register) collect these toll tickets and send them to the billing center.

A WLAN is Local Area Network (LAN) that uses high frequency radio waves or other wireless media instead of wires to communicate and transmit data among nodes. It is a flexible data communications system implemented as an extension to, or as an alternative to, a wired LAN within a building or campus. WLAN can also be used to complement a wide-area cellular data access, such as a GPRS (General Packet Radio System). WLAN may provide the mobile subscribers fast Internet access. The service may be available for customers with a subscription.

A challenge is to provide a suitable charging method for WLAN services available for the subscribers of communications networks.

SUMMARY OF THE INVENTION

A feature of the present invention is to provide a new charging method for communications network subscribers using, for instance, WLAN services.

This may be achieved by methods and systems and an authentication server according to embodiments of the invention.

The invention, among other things, is based on sending a messaging message to a predetermined destination address from a system element in order to bill a customer for use of a chargeable service, when the system element knows the user's telephone number or other user identification. The network element acts as a user's terminal equipment and sends the messaging message on user's behalf. A message center, or other network entity in the communications system, is configured to charge the user according to the fee associated with the destination number. For example, the messaging message may be a short message sent to a predetermined number, which causes a short message center to bill the user accordingly.

An advantage of the methods and arrangements of the invention and its embodiments is to provide a generic way of billing fixed price services. The approach also offers more transfer capacity to an access network for ordering services compared to conventional solutions.

BRIEF DESCRIPTION OF THE DRAWINGS

In the following the invention will be described in greater detail by preferred embodiments with reference to the attached drawings, in which.

DETAILED DESCRIPTION OF THE PREFERRED EMBODIMENTS

Figure 1:
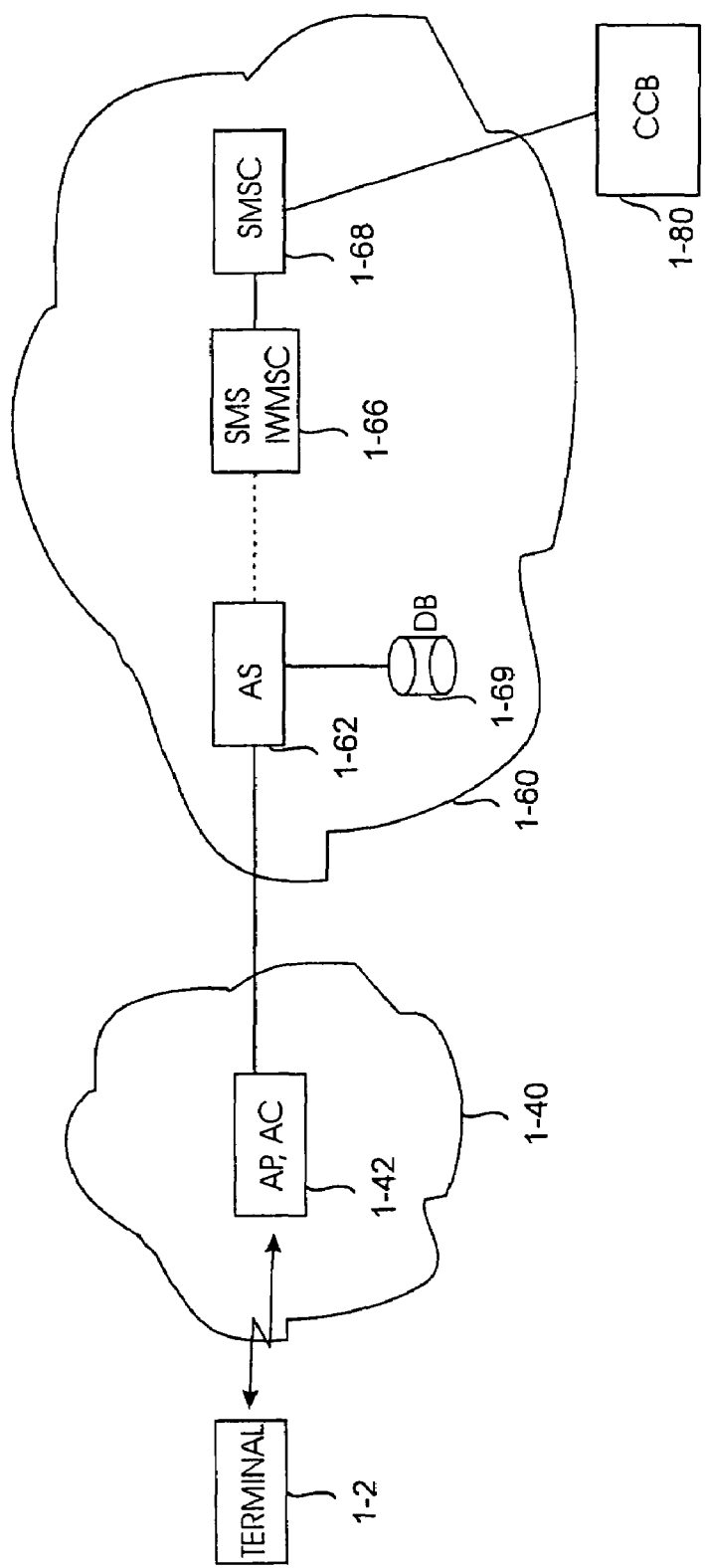
FIG. 1 shows a general system chart of a communications system to which the invention can be applied.

FIG. 1 shows a general system chart of a communications system to which the invention can be applied. The chart comprises a terminal 1-2, an access network 1-40, a communications network 1-60, and a billing system 1-80. All of these elements will be discussed next.

It should be noted that although in the following the invention is described in the context of a short message and a short message service, a message can comprise, e.g., at least one of the following messages: a short message, an instant message, an e-mail message, a multimedia message, a unified messaging message, a WAP (Wireless Application Protocol) message or a SIP (Session Initiation Protocol) message.

The terminal element 1-2 in FIG. 1 includes, for example, terminals, user equipment, mobile stations, laptop computers etc., capable of accessing the access network. In the public access zone context, a user of the terminal is typically a business traveler equipped with a laptop PC (Personal Computer), who needs to gain access to the Internet or his company Intranet. The terminal may or may not be equipped with at least one of the above-mentioned message services, e.g. with a short message service. However, from the present invention point of view it is only required that a user or subscriber of a terminal can be billed for use of a messaging service.

One example of the access network 1-40 is wireless local area network WLAN that uses high frequency radio waves or other wireless medium. The WLAN solution can comprise WLAN cards for the laptops, wireless access points (AP), an access controller (AC) and an authentication server (AS) in the communications network. This allows any WLAN subscriber to insert his/her SIM (Subscriber Identity Module) card into a multimode radio card element or to use any other Wi-Fi compatible terminal with application specific software and to authenticate to the service and have a broadband connection e.g. to public Internet. As alternatives to the WLAN wireless access network system, the basic principles of the invention and its embodiments can be employed by any wireless access networks like a pico network bluetooth or IrDa or the like, or a wired access system.

The embodiments which use WLAN, are based on the standard IEEE (The Institute of Electrical and Electronics Engineers, Inc) 802.11 WLAN air interfaces. The standard specifies the air interfaces between a wireless client and a base transceiver station or access point, as well as between wireless clients. The IEEE802.11b standard, for example, is a wireless LAN standard that is ratified from the IEEE802.11 for high rate wireless LAN.

The access point AP 1-42 in the access network can be a physical device but normally invisible to the user, and which can automatically connect the terminal 1-2 to the access network 1-40. It can also transfer information from a wired LAN to the wireless LAN and vice-versa connecting wired and wireless networks together when the user is operating a wireless device within a particular range.

The access controller AC 1-42 in the access network can have many functions like handling authentication, authorization and collecting of billing information for users in an access area, e.g. in public access zones. An access zone area can be defined as a space restricted area, typically a building, where a user can get access to the Internet, through wire or wirelessly. The access controller AC can also be a gateway between the Internet and wireless stations that are attached to a wireless LAN. Furthermore, the access controller can handle user authentication and control the data sent to and from the Internet. The access controller monitors usage in real time and gathers accounting information, such as used access time and/or transferred data.

The access controller can also support centralized architecture meaning that the access controller can also be located at operator premises, in a centralized location. This enables additional flexibility when planning the architecture and transmission links needed for an operator's WLAN.

The terms access controller 1-42 and access point 1-42 can also be called by a common term access node (AN) meaning either AC or AP depending on the network architecture.

In communications network 1-60 the element AS 1-62 represents the authentication server. It has three main functions: it authenticates the SIM users accessing the operator's network via wireless LAN; it provides charging information to be processed in the customer care and billing system CCB 1-80 in the MSC site; and it supports global roamers entering the network by providing SS7 (Signaling System Number 7) roaming capabilities.

The authentication server (AS) can support several access controller connections simultaneously. Thus, it can provide authentication services and charging information for a number of wireless access zones at the same time. The number of access zones supported is dependent on the number of simultaneous subscribers.

In the operation of the invention and certain example embodiments the access controller AC can pass the authentication information through the authentication server AS to the operator network MSC/HLR. The operator's network then performs the access control checks and authentication just as with GSM authentication. The charging of the user can be integrated into the mobile operators billing systems.

The authentication and accounting of the subscriber can be based on a SIM card in conjunction with the authentication server (AS) and user ID (Identification)/password based in conjunction with any standard RADIUS (Remote Authentication Dial-In User Service) server. Methods are preferably transparent for each other, so it is possible to offer both methods in parallel or alternatively either of the methods in an access zone with only one configuration.

The authentication server can support different protocols. The interface between the authentication server (AS) and the billing system CCB (Customer Care and Billing System) can be based, in case of a GPRS communications network, on enhanced GPRS tunneling protocol GTP' (General Packet Radio Service Tunneling Protocol) protocol. The WLAN solution is compatible with a charging gateway, and it provides a standard GTP' interface. GTP' is used in the GPRS system for similar purposes, which ensures the compatibility with GPRS billing systems. There can be a uniquely defined open GTP' interface in the network, or a combination of several GTP' versions and a number of various ticket formats. GTP' may, however, require system integration support and tailoring when connected to other operators' billing systems. The possibility of using the FTP (File Transfer Protocol) protocol for transferring charging data directly to the billing system is also supported. The FTP connection, may however, require integration and tailoring by the operator's billing system. The physical interfaces of GTP' and FTP can be 10/100 BaseT Ethernet.

For billing schemes, there are many different available alternatives. The charging data is transmitted within charging records CDR. The CDR can contain, for example, the following information possibly used for billing and/or tariffing: connection time; number of transmitted octets; location where the connection was made which enables location-based billing; the subscriber's IMSI number; and IP addresses of the authentication server and the access controller.

In the communications system 1-60 like in the GSM system, the short message service SMS offers capabilities for transferring short messages having a limited length. The short message service center SMSC 1-68 can also be external to the GSM network.

Signaling between AS element and SMS-IWMSC element can proceed via a public land mobile network (PLMN). It can be described to be a mobile communications network providing land mobile communications services to the public. Different alternatives comprise networks like GSM GPRS, UMTS (Universal Mobile Telecommunications System) and CDMA2000 (Code Division Multiple Access 2000).

An interworking mobile services switching center (MSC) for short message service SMS-IWMSC 1-66 is capable of receiving short messages from the PLMN and submitting them to the recipient short message service center SMSC. SMS-IWMSC can also transfer to the recipient short message service center SMSC alert SC procedures from the network.

The selection of elements MSC and SMS-IWMSC, which serves essentially the same functionality, depends on the network architecture.

The protocol between the access network and the communications network can be the above-mentioned protocol RADIUS. This is a remote authentication dial-in user service protocol most commonly used in IP (Internet Protocol) access, user authentication, PI address allocation, authorization and accounting service between a server and client. In operator's wireless LAN systems, RADIUS can carry user authentication and billing information between the public WLAN access network and the cellular network. In the GPRS network the gateway GPRS support node GGSN can use the RADIUS protocol to authenticate the user and to get the user IP address from a corporate RADIUS server.

Figure 2:
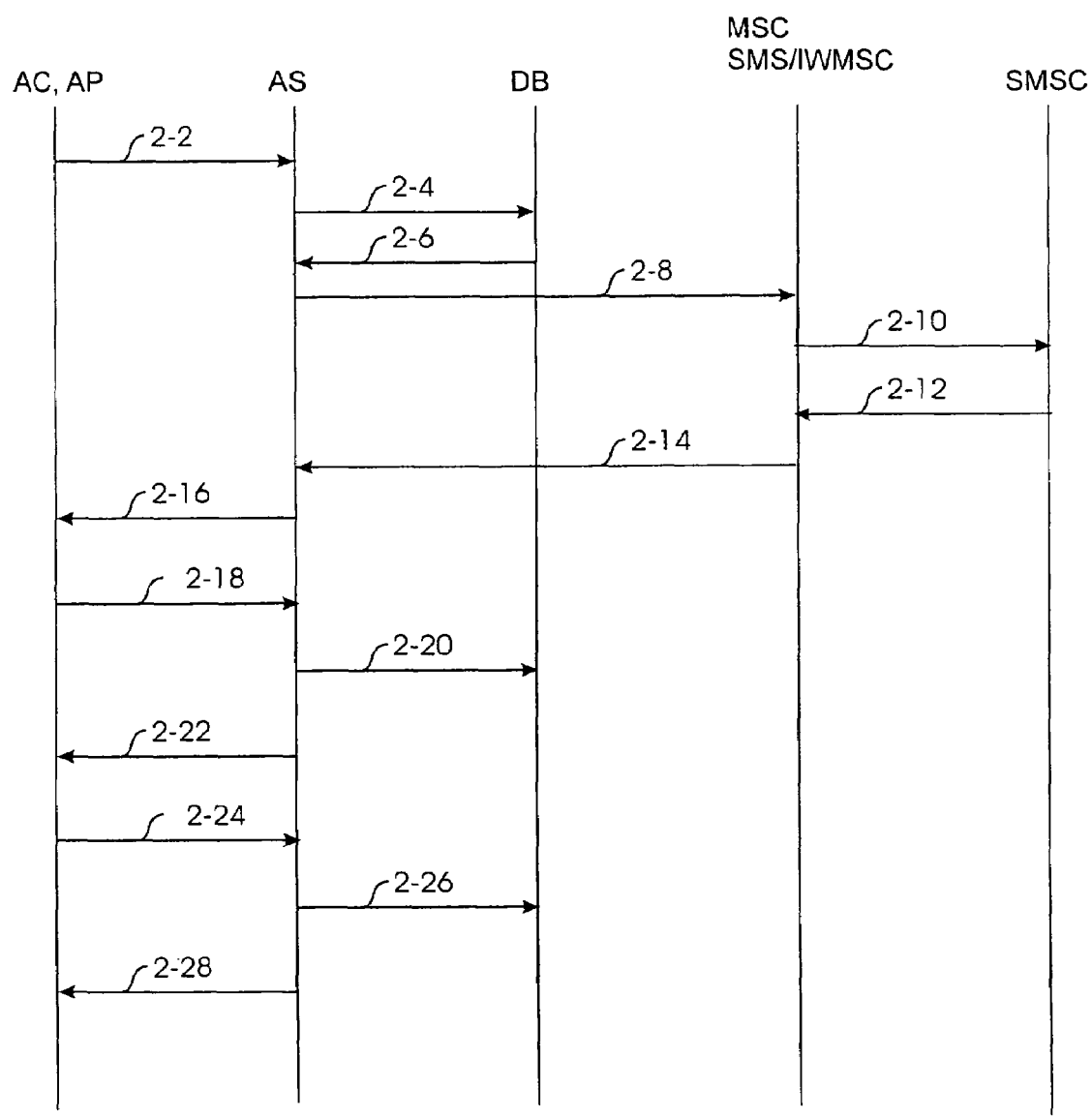
FIG. 2 shows a signaling chart according to the invention and its embodiments.

FIG. 2 shows a signaling chart for generating correct billing information through mobile originated short message service (MO SMS) according to embodiments of the invention. The example can also be described to be the usage of sending to a short number an SMS from a system element to bill customers for one time charged fixed price services, when the system element knows the users phone number or other user identification. The services, which can be provided or offered and charged according to the invention and its embodiments can comprise, e.g., the following services: access to Internet, an intranet, a pay-tv or the like, such as Lisa paid 6 dollars for 1 hour Internet connection; Pelle Ramstedt paid 7 dollars for the video film in his hotel room TV, or use of a WLAN-based charging solution for any service, for example, Kalle ordered sandwiches to his hotel room for 10 dollars, and consumed drinks from the mini bar, 6 dollars. The acceptance of charging of the fixed-priced can be asked either prior to or after the generation of said message.

In FIG. 2, in response to communications between user equipment and an access point (AP) or an access controller (AC) of an access network either element AP or element AC can send in step 2-2 to authentication server element (AS) an accounting request, e.g. a RADIUS_Accounting_Start message. The message may comprise only the session identification. In response to the message the element AS retrieves information of the subscriber of the user equipment and asks in step 2-4 a database about the nature of the session that should be billed. The query can include the asking of the information on the price of the service, and the protocol between the database and the authentication server can be structured query language SQL, which is a standard language for creating, updating and querying relational database management systems. In step 2-6 the asked information is retrieved to AS element. The authentication element AS can retrieve subscriber information by sending an session information request to the database. The session information request can comprise only the identification of a session of said user equipment or some other information.

The embodiment uses the fact that AS element knows the customer's identification, e.g. MSISDN number, which is the mobile subscriber international ISDN (Integrated Services Digital Network) number consisting of the country code, the national destination code, and the subscriber number, and uniquely defining the mobile subscriber at an international level. The identification can also be a phone number or other user identification like IMSI (International Mobile Subscriber Identity) number.

Having now the information of the subscriber, AS can produce a short message. This message, which has an identification of said subscriber, can be called e.g. a pseudo short message since it is not the subscriber that generates the message but the authentication server element that generates it pretending to be the subscriber. The network element pretends to be a user's phone and sends a SMS short number on his behalf.

In certain embodiments, the short message can be sent to a special purpose number. This number works in the same way as service numbers, when subscriber's orders e.g. icons or ringing tunes to their mobile phones. When the short message is sent to the number, the operator can charge the customer a fixed sum and the operator does not need to make any changes to the billing center. The SMSC has special purpose software attached to the short number in use, which takes care of the actual billing.

In step 2-8 the authentication server sends the short message to interworking MSC element SMS IWMSC, which then in step 2-10 forwards the message to the short message service center. The short message can be called a mobile originated (MO) short message because the message is sent to the direction of the short message service center SMSC via a mobile services switching center. The SMSC can then start procedures in order to charge the subscriber.

To ensure for the subscriber that the short message succeeded to reach the short message service center and that the ordered service can be charged and thus used, the SMSC element can return an acknowledgement message to the authentication server via MSC SMS IWMSC in step 2-12. The authentication server can then in step 2-16 forward an accounting response to the accounting start message to AC element to AP element.

The following messages 2-18 . . . 2-22 in FIG. 2 are for information updating purposes. The customer may already been charged, but different updating e.g. to traffic information can be send from AC/AP to AS and further to database. This can be done e.g. for fraud prevention, statistics and data mining purposes.

The subscriber's session to the access network can end when in step 2-24 AC/AP sends RADIUS_Accounting_Stop message to AS. This will activate a cleanup script and the session-stopped information can be conveyed to database in step 2-26. Alternatively the database can check if the user's session time has expired. In that case the user can be removed or marked as expired.

Wireless LAN solution according to various embodiments of the invention complements the wide-area cellular data access, such as GPRS, by offering a highly cost-effective solution for wireless broadband data access. WLAN can provide mobile subscribers fast Internet access over Wireless local area networks.

The implementation of the invention and its embodiments can preferably support, e.g., both UserID/password- and SIM-based authentication. The latter way of authenticating can use a SIM card that can be inserted into the multimode radio card element. This makes the service very convenient to use.

For terminals that have either integrated 801.11b wireless LAN device or users utilizing some other devices it is possible to provide SIM-based authentication with a application specific software and external SIM-reader attached on a laptop USB-port. Combined with cellular SIM based user authentication and billing characteristics WLAN solution allows the mobile operator to implement fast wireless Internet access cost-effectively for the roaming laptop users with cellular subscription. Furthermore, the solution provides roaming between different operator networks. This network service can be offered e.g. at places like airports, railway stations, hotels, business parks and even large company offices, or wherever traveling business consumers use their laptops and they need be connected to network.

Although the preferred embodiments of the invention are described in connection with the GSM communications network, the basic principles of the invention can be employed by any communications network such as PMR (Private Mobile Radio), PAMR (Public Access Mobile Radio) or PLMN (Public Land Mobile Network), when the employed communications system includes a message service and can be connected to a billing system. Examples of alternative communications networks are GPRS and UMTS networks.

The invention relates to methods of charging the subscriber of the communications system. The subscriber can access or use a chargeable service through an access network meaning that the subscriber can first communicate over the access network, like a WLAN network. However, the service does not have to be communicated over the access network, but it can be communicated, e.g., via another communications network like GSM network or Internet network. It will be apparent to a person skilled in the art that the inventive concept can be implemented in various ways. The invention and its embodiments are thus not limited to the examples described above but only by the scope of the claims.

One having ordinary skill in the art will readily understand that the invention as discussed above may be practiced with steps in a different order, and/or with hardware elements in configurations which vary from those which are disclosed. Therefore, although the invention has been described based upon these preferred embodiments certain modifications, variations, and alternative constructions would be apparent to the skilled artisan, are considered to be within the spirit and scope of the invention.

The invention claimed is:

1. A communications system, the communications system comprising:
 a subscriber device configured to communicate over an access network in order to access or use a chargeable service; and a network entity responsible for initiating of charging relating to the chargeable service configured to create a messaging message according to a messaging method of the communications system, said messaging message indicating the subscriber device as an originator of the message, wherein the network entity sends the messaging message to a predetermined destination address selected according to said chargeable service, and in response to receiving said messaging message at said predetermined destination address, the communications system charges said subscriber device according to a predetermined fee associated with said destination address as if the subscriber device itself had sent the messaging message.

2. The communications system according to claim 1, wherein said access network is a wireless local area network.

3. The communications system according to claim 1, wherein said messaging message comprises one of the following: a short message, an instant message, an e-mail message, a multimedia message, a unified messaging message, a wireless application protocol message or a session initiation protocol message.

4. A method of charging a subscriber of a communications system, comprising:

in response to a communication between a user equipment and an access node of an access network, receiving an accounting request, at an authentication unit, from said access node;

retrieving information of said subscriber of said user equipment using said authentication unit;

generating a message, by said authentication unit, said message comprising at least an identification of said subscriber as an originator of the message;

sending, by said authentication unit, said message to a predetermined destination address selected according to a service to be charged; and in response to the sending of said message to the predetermined destination address, charging the subscriber according to a messaging fee associated with the predetermined destination address.

5. The method according to claim 4, further comprising:

retrieving subscriber information by said authentication unit by sending an session information request to a database, which session information request comprises an identification of a session of said user equipment; and retrieving session information by said database and sending to said authentication unit a session information response.

6. The method according to claim 5, further comprising updating traffic information to said database.

7. The method according to claim 4, wherein said subscriber of said user equipment is asked to accept the charging either prior to or after the generation of said message.

8. The method according to claim 4, wherein said message comprises one of a short message, an instant message, an e-mail message, a multimedia message, a unified messaging message, a wireless application protocol message or a session initiation protocol message.

9. The method according to claim 4, wherein said charging is performed by a message center located in said communications system.

10. The method according to claim 9, wherein said authentication unit is a packet-mode server in a mobile communications network, and wherein said message is routed between said authentication unit and said message center through a gateway and serving nodes of said mobile communications system.

11. The method according to claim 4, wherein said access network is one of the following: a wireless local area network or a bluetooth network.

12. The method according to claim 4, wherein a protocol used between the access network and the communications system is remote authentication dial-in user service protocol.

13. The method according to claim 4, wherein said access node is an access point or an access controller.

14. A communications system, comprising:

user equipment associated with subscribers;

an access network configured to provide access to at least one chargeable service for the subscribers;

a messaging system; and a network entity configured to initiate charging of said at least one chargeable service, wherein said network entity being configured to create a messaging message according to said messaging system of the communications system, when a subscriber uses a chargeable service, said messaging message indicating said subscriber as an originator of the message, the network entity being further configured to send the messaging message to a predetermined destination address selected according to said chargeable service, the messaging system being configured, in response to sending said messaging message to said predetermined destination address, to charge the subscriber according to a predetermined fee associated with said destination address as if the subscriber itself had sent the messaging message.

15. The system according to claim 14, wherein said access network is a wireless local area network.

16. The system according to claim 14, wherein said messaging message comprises one of the following: a short message, an instant message, an e-mail message, a multimedia message, a unified messaging message, a wireless application protocol message or a session initiation protocol message.

17. An authentication center for charging a subscriber of a communications network, the authentication center comprising:

means for receiving, in response of a communication between a user equipment and an access node of an access network, an accounting request from said access node;

means for retrieving information of a subscriber of said user equipment;

means for generating a message indicating said subscriber as an originator of the message; and means for sending to a message center said message for informing said message center of a fixed-priced process that can be charged from said subscriber.

18. The authentication center according to claim 17, wherein said access node is an access point or an access controller.

19. A method, comprising:

receiving a communication by a subscriber over an access network in order to access or use a chargeable service; and creating by a network entity responsible for initiating of charging a messaging message according to a messaging method of the communications system, said messaging message indicating the subscriber as an originator of the message;

sending by the network entity the messaging message to a predetermined destination address selected according to said chargeable service; and in response to sending said messaging message to said predetermined destination address, charging said subscriber according to a predetermined fee associated with said destination address as if the subscriber itself had sent the messaging message.

20. The method according to claim 19, wherein said access network is a wireless local area network.

21. The method according to claim 19, wherein said messaging message comprises one of the following: a short message, an instant message, an e-mail message, a multimedia message, a unified messaging message, a wireless application protocol (WAP) message or a session initiation protocol (SIP) message.

22. An authentication center for charging a subscriber of a communications network, comprising:
 a receiver configured to receive, in response of a communication between a user equipment and an access node of an access network, an accounting request from said access node;
 a retrieving unit configured to retrieve information of a subscriber of said user equipment;
 a generating unit configured to generate a message indicating said subscriber as an originator of the message; and
 a sending unit configured to send to a message center said message for informing said message center of an fixed-priced process that can be charged from said subscriber.

23. The authentication center according to claim 22, wherein said access node is an access point or an access controller.

* * * * *